(12) United States Patent
Lee et al.

(10) Patent No.: US 10,787,594 B2
(45) Date of Patent: Sep. 29, 2020

(54) OPTICAL ADHESIVE COMPOSITION AND OPTICAL ADHESIVE FILM

(71) Applicant: LG Chem, Ltd., Seoul (KR)

(72) Inventors: Seung-Won Lee, Seoul (KR); Eun-Kyung Park, Seoul (KR); Tae-Yi Choi, Gyeonggi-do (KR); Won-Gu Choi, Gyeonggi-do (KR); Jang-Soon Kim, Gyeonggi-do (KR)

(73) Assignee: LG Chem, Ltd. (KR)

( * ) Notice: Subject to any disclaimer, the term of this patent is extended or adjusted under 35 U.S.C. 154(b) by 160 days.

(21) Appl. No.: 15/557,276

(22) PCT Filed: Mar. 22, 2016

(86) PCT No.: PCT/KR2016/002875
§ 371 (c)(1),
(2) Date: Sep. 11, 2017

(87) PCT Pub. No.: WO2017/014401
PCT Pub. Date: Jan. 26, 2017

(65) Prior Publication Data
US 2018/0057715 A1   Mar. 1, 2018

(30) Foreign Application Priority Data

Jul. 21, 2015   (KR) .......................... 10-2015-0102961

(51) Int. Cl.
*C09J 113/00* (2006.01)
*C09J 4/00* (2006.01)
(Continued)

(52) U.S. Cl.
CPC .......... *C09J 113/00* (2013.01); *C08F 236/08* (2013.01); *C08K 5/0025* (2013.01); *C08K 5/01* (2013.01);
(Continued)

(58) Field of Classification Search
None
See application file for complete search history.

(56) References Cited

U.S. PATENT DOCUMENTS 3,598,776 A * 8/1971 Schirmer ................ C08L 23/02
524/274
2003/0216519 A1* 11/2003 Heilmann .......... C09D 201/005
525/191

(Continued)

FOREIGN PATENT DOCUMENTS

CN       1603866 A    4/2005
CN     101445711 A    6/2009
(Continued)

OTHER PUBLICATIONS

Machine translation of JP 2010138290 A (Year: 2010).*
(Continued)

*Primary Examiner* — Frank D Ducheneaux
(74) *Attorney, Agent, or Firm* — Lerner, David, Littenberg, Krumholz & Mentlik, LLP

(57) ABSTRACT

The present invention relates to an optical adhesive composition including: a thermosetting component including an isoprene-based rubber containing a carboxyl group, and a thermal curing agent; and a photo-curable component including an acrylic acid ester-based monomer, and a photoinitiator, in order to exhibit high barrier performance on the basis of a low water vapor transmission rate, and simultaneously, exhibit excellent adhesive performance by being applied to an optical device or a display device. In addition, the present invention provides an optical adhesive film including an adhesive layer including a photo-cured product of the optical adhesive composition, thereby obtaining advantages of ensuring an excellent cutting property and an excellent handling property, and improving a step difference absorbency.

17 Claims, 1 Drawing Sheet

(51) Int. Cl.
- *C09J 109/00* (2006.01)
- *C09J 7/35* (2018.01)
- *C09J 7/20* (2018.01)
- *C08F 236/08* (2006.01)
- *C08K 5/132* (2006.01)
- *C08K 5/3412* (2006.01)
- *C08K 5/01* (2006.01)
- *C08K 5/101* (2006.01)
- *C08K 5/29* (2006.01)
- *C08K 5/00* (2006.01)
- *C09J 4/06* (2006.01)

(52) U.S. Cl.
CPC .............. *C08K 5/101* (2013.01); *C08K 5/132* (2013.01); *C08K 5/29* (2013.01); *C08K 5/3412* (2013.01); *C09J 4/00* (2013.01); *C09J 4/06* (2013.01); *C09J 7/35* (2018.01); *C09J 109/00* (2013.01); *C09J 7/20* (2018.01); *C09J 2203/318* (2013.01); *C09J 2205/102* (2013.01); *C09J 2413/00* (2013.01)

(56) References Cited

U.S. PATENT DOCUMENTS

| | | |
|---|---|---|
| 2005/0014879 A1 | 1/2005 | Moroishi et al. |
| 2009/0030107 A1 | 1/2009 | Watanabe et al. |
| 2011/0014410 A1* | 1/2011 | Kishioka ............... C08F 220/18 428/41.8 |
| 2014/0248498 A1 | 9/2014 | Kobayashi et al. |
| 2015/0083317 A1 | 3/2015 | Zhang et al. |

FOREIGN PATENT DOCUMENTS

| | | | |
|---|---|---|---|
| CN | 104449422 | A | 3/2015 |
| JP | 2007254662 | A | 10/2007 |
| JP | 2010138290 | A * | 6/2010 |
| KR | 20080012915 | A | 2/2008 |
| KR | 100988185 | B1 | 10/2010 |
| KR | 20140063529 | A | 5/2014 |
| KR | 101459125 | B1 | 11/2014 |
| KR | 20140145084 | A | 12/2014 |
| KR | 20150023538 | A | 3/2015 |
| TW | 201323555 | | 6/2013 |
| WO | 2009154138 | A1 | 12/2009 |

OTHER PUBLICATIONS machine translation of CN 101445711 A (Year: 2009).*
Office Action of the State Intellectual Property Office of People's Republic of China for Application No. 2016800136721.3 (Year: 2019).*
Japanese Application 2010517886 associated with WO 2009/154138 (Year: 2010).*
Search report from International Application No. PCT/KR2016/002875, dated May 26, 2016.

* cited by examiner

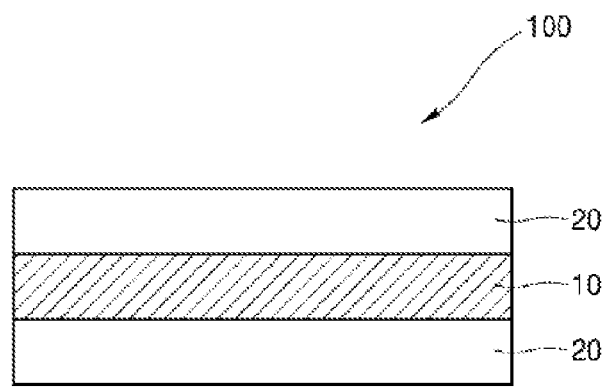

OPTICAL ADHESIVE COMPOSITION AND OPTICAL ADHESIVE FILM

CROSS-REFERENCE TO RELATED APPLICATIONS

The present application is a national phase entry under 35 U.S.C. § 371 of International Application No. PCT/KR2016/002875 filed Mar. 22, 2016, which claims priority from Korean Application No. 10-2015-0102961 filed Jul. 21, 2015, all of which are incorporated herein by reference.

TECHNICAL FIELD

The present invention relates to an optical adhesive composition relates to an optical adhesive composition which may exhibit high barrier performance based on a low water vapor transmission rate, and simultaneously, may exhibit excellent adhesive performance by being applied to an optical device or a display device, and an optical adhesive film including an adhesive layer including a cured product of the optical adhesive composition.

BACKGROUND ART

A touch material including an electronic device or a transparent conductive film, and the like needs moisture prevention performance in order to maintain an excellent operation or a predetermined service life. Furthermore, a lot of interests have been recently focused on the development of an adhesive composition for improving durability and optical characteristics of a device such as an OLED or a touch screen panel.

In general, an adhesive used in an OLED or a touch screen panel, and the like needs to secure optical characteristics such as transparency and visibility. For this purpose, in the related art, an adhesive including an acrylic resin as a base resin has been generally used, but in this case, durability and water vapor transmission resistance need to be complemented because water vapor transmission performance is not sufficient.

Specifically, a rubber-based resin has been used in order to complement durability and water vapor transmission resistance, and in this case, there is a disadvantage in that adhesive strength is not sufficient due to low surface energy and wettability of a rubber component. Further, when the rubber-based resin is used for sealing an electronic device or an OLED, and the like due to high elastic characteristics of the rubber component, there is a disadvantage in that a step difference fails to be absorbed.

Therefore, there is a need for studies for improving durability and water vapor transmission resistance, and simultaneously, securing characteristics in which adhesive performance and step difference absorbing performance are excellent.

DETAILED DESCRIPTION OF THE INVENTION

Technical Problem

An exemplary embodiment of the present invention provides an optical adhesive composition which has excellent barrier performance against water vapor, and thus improves durability and water vapor transmission resistance, and also exhibits excellent adhesive performance when applied to a specific article.

Further, another exemplary embodiment of the present invention provides an optical adhesive film which has an excellent cutting property and an excellent handling property and finally exhibits excellent adhesive performance through an appropriate curing process.

Technical Solution

An exemplary embodiment of the present invention provides an optical adhesive composition including: a thermosetting component including an isoprene-based rubber containing a carboxyl group, and a thermal curing agent; and a photo-curable component including an acrylic acid ester-based monomer, and a photoinitiator.

Another exemplary embodiment of the present invention provides an optical adhesive film including: an adhesive layer including a photo-cured product of the optical adhesive composition; and a release film disposed on one surface or both surfaces of the adhesive layer.

Advantageous Effects

The optical adhesive composition has excellent barrier performance against water vapor, and thus may improve durability and water vapor transmission resistance, and may also exhibit excellent adhesive performance when applied to a specific article.

Further, the adhesive film may secure an excellent cutting property and an excellent handling property and may exhibit excellent step difference absorbency by including an adhesive layer including a photo-cured product of the optical adhesive composition. In addition, it is possible to obtain an advantage in that excellent adhesive performance and excellent barrier performance are finally implemented through an additional and appropriate curing process.

BRIEF DESCRIPTION OF DRAWINGS

FIG. 1 schematically illustrates an optical adhesive film according to an exemplary embodiment of the present invention.

BEST MODE

The benefits and features of the present invention, and the methods of achieving the benefits and features will become apparent with reference to Examples to be described below. However, the present invention is not limited to the Examples to be disclosed below, but may be implemented in various other forms, and the present Examples are only provided for rendering the disclosure of the present invention complete and for fully representing the scope of the invention to a person with ordinary skill in the art to which the present invention pertains, and the present invention will be defined only by the scope of the claims. Throughout the specification, like reference numerals indicate like constituent elements.

In the drawings, the thicknesses of several layers and regions are enlarged so as to clearly express the layers and the regions. Moreover, in the drawings, the thicknesses of some layers and regions are exaggerated for convenience of explanation.

Further, in the present specification, a case where a part such as a layer, a film, a region, and a plate is present "on" or "at an upper portion of" another part includes not only a case where the part is present "immediately on" another part, but also a case where still another part is present therebetween. Conversely, the case where a part is present "immediately on" another part means that no other part is present therebetween. Furthermore, a case where a part such as a layer, a film, a region, and a plate is present "under" or "at a lower portion of" another part includes not only a case where the part is present "immediately under" another part, but also a case where still another part is present therebetween. Conversely, the case where a part is present "immediately under" another part means that no other part is present therebetween.

An excellent embodiment of the present invention provides an optical adhesive composition including: a thermosetting component including an isoprene-based rubber containing a carboxyl group, and a thermal curing agent; and a photo-curable component including an acrylic acid ester-based monomer, and a photoinitiator.

The optical adhesive composition may be applied to an OLED or a touch screen panel, and may exhibit high barrier performance against water vapor, and the like based on a low water vapor transmission rate, and simultaneously, may exhibit excellent adhesive performance by including the thermosetting component and the photo-curable component together.

The optical adhesive composition has a double curing property, the double curing property means a characteristic in which the optical adhesive composition is cured two times by using a separate step, and specifically, the curing two times may be composed of a primary photo curing and a secondary thermal curing. In this case, the photo-curable component is a component which is cured during the primary photo curing, and the thermal curable component is a component which is cured during the secondary thermal curing. Since the optical adhesive composition has a double curing property, it is possible to manufacture an adhesive film which has an excellent cutting property and an excellent handling property by using the same, and as a result, it is possible to implement both excellent barrier performance and excellent adhesive performance.

In the present specification, 'cutting property and handling property' means excellent durability which is exhibited when an adhesive film is cut into a desired size or is handled for distribution or movement, and 'barrier performance' means performance which prevents an external material such as water vapor from permeating.

Specifically, the optical adhesive composition may include the photo-curable component in an amount of about 5 to about 70 parts by weight based on 100 parts by weight of the thermosetting component. When the photo-curable component is included in an amount of less than about 5 parts by weight, the optical adhesive composition contains the thermosetting component in an extremely excessive amount, and it may be difficult to improve a cutting property and a handling property of an adhesive film formed of the optical adhesive composition. Further, when the photo-curable component is included in an amount of more than about 70 parts by weight, the optical adhesive composition contains the thermosetting component in an extremely small amount, and the content of a component, which is cured after the optical adhesive composition is attached to a base material, is decreased, so that there is a concern in that an effect of improving step difference absorbency and improving peel strength becomes minimal.

The thermosetting component may include an isoprene-based rubber containing a carboxyl group. An isoprene-based rubber used for an existing adhesive has an effect of improving durability and water vapor transmission resistance, but has a limitation in being used because the adhesive performance is not sufficient. In contrast, the optical adhesive composition may include an isoprene-based rubber containing a carboxyl group to secure appropriate wettability due to the hydrophilicity of the carboxyl group, and simultaneously, to implement excellent barrier performance due to low water vapor transmission performance resulting from the isoprene-based rubber.

Specifically, the isoprene-based rubber containing the carboxyl group may be prepared by polymerizing or copolymerizing an isoprene monomer and an isoprene monomer containing a carboxyl group.

In this case, the isoprene-based rubber containing a carboxyl group may have a weight average molecular weight (Mw) of about 20,000 to about 200,000, for example, about 20,000 to about 40,000. The isoprene-based rubber containing a carboxyl group has a weight average molecular weight within the range, so that the optical adhesive composition may have an appropriate viscosity, and may exhibit a physical property capable of being uniformly coated.

The isoprene-based rubber containing a carboxyl group may include the carboxyl group in an amount of about 1 to about 15 wt %, for example, about 5 to about 15 wt %. There may occur problems in that when the content of the carboxyl group is less than the range, it is difficult to implement target adhesive performance, and when the content of the carboxyl group is more than the range, curing efficiency deteriorates.

The isoprene-based rubber containing a carboxyl group is one of the thermosetting components, and is characterized by not including a photo-curable functional group. That is, the isoprene-based rubber containing a carboxyl group may have a characteristic in which the isoprene-based rubber containing a carbonyl group is not cured by photo irradiation. The isoprene-based rubber containing a carboxyl group does not have any photo-curable functional group, and as a result, the isoprene-based rubber containing a carboxyl group may not be cured during the photo curing of the double curing, and may be cured only during the thermal curing of the double curing. Consequently, in this case, improved adhesive performance and improved step difference absorbency performance may be imparted to an adhesive film manufactured by using the optical adhesive composition, and an excellent cutting property and an excellent handling property may be secured.

The thermosetting component may include a thermal curing agent. The thermal curing agent is a material which contributes to curing by being chemically reacted with a carboxyl group of the isoprene-based rubber containing the carboxyl group by heat energy, and may include at least one selected from the group consisting of an aziridine-based curing agent, an amine-based curing agent, an isocyanate-based curing agent, an epoxy-based curing agent, and a combination thereof.

For example, the thermal curing agent may include an aziridine-based curing agent, and this case may be advantageous in consideration of excellent optical characteristics, a fast curing time, a low curing temperature, compatibility with a binder resin, and the like.

The thermosetting component may include the thermal curing agent in an amount of about 0.05 to about 5 parts by weight based on 100 parts by weight of the isoprene-based rubber containing a carboxyl group. The thermal curing agent is included within the range, and thus may implement a target curing degree through a thermal curing of the optical adhesive composition, and may impart excellent adhesive performance and optical characteristics to an adhesive film manufactured by using the optical adhesive composition.

The photo-curable component may include an acrylic acid ester-based monomer. The acrylic acid ester-based monomer is a component which is cured by photo irradiation, and specifically, may include at least one selected from the group consisting of dicyclopentadiene (meth)acrylate, isobornyl (meth)acrylate, cyclohexyl (meth)acrylate, stearyl (meth) acrylate, tricyclodecane dimethanol diacrylate, dipentaerythritol pentaacrylate, pentaerythritol tetraacrylate, trimethylolpropane trimethacrylate, nonanediol dimethacrylate, cyclohexanediol dimethacrylate, and a combination thereof. The '(meth)acrylate' means acrylate or methacrylate.

For example, the acrylic acid ester-based monomer may include isobornyl (meth)acrylate, tricyclodecane dimethanol diacrylate, or trimethylolpropane trimethacrylate, and this case may be advantageous particularly in consideration of compatibility with a binder resin, optical characteristics, a curing degree, curing density, and durability.

The photo-curable component may include a photoinitiator. The photoinitiator is a material which is activated by photo irradiation to perform catalysis which initiates curing, and for example, the photoinitiator may include at least one selected from the group consisting of benzoin methyl ether, 2,4,6-trimethylbenzoyl diphenylphosphine oxide, bis(2,4,6-trimethylbenzoyl) phenylphosphine oxide, $\alpha,\alpha$-methoxy-$\alpha$-hydroxyacetophenone, 2-benzoyl-2-(dimethylamino)-1-[4-(4-morpholinyl)phenyl]-1-butanone, 2,2-dimethoxy-2-phenylacetophenone, 2,2-dimethoxy-1,2-diphenylethan-1-one, 1-hydroxy-cyclohexyl-phenyl ketone, 2-benzyl-2-(dimethylamino)-1-[4-(4-morpholinyl)phenyl]-1-butanone, and a combination thereof, and is not limited thereto.

The photo-curable component may include the photoinitiator in an amount of about 0.05 to about 1.5 parts by weight, for example, about 0.1 to about 0.5 part by weight, based on 100 parts by weight of the acrylic acid ester-based monomer. The photoinitiator is included within the range, and thus may implement a target curing degree through a photo curing of the optical adhesive composition, and may impart an excellent cutting property and an excellent handling property to an adhesive film manufactured by using the optical adhesive composition.

The optical adhesive composition includes both the isoprene-based rubber containing a carboxyl group and the acrylic acid ester-based monomer, and in this case, the difference in refractive index between the isoprene-based rubber containing a carboxyl group and the acrylic acid ester-based monomer may be about 0 to about 0.1. The refractive indices of the isoprene-based rubber containing a carboxyl group and the acrylic acid ester-based monomer may be measured by using a typical refractometer. The difference in refractive index satisfies the range, and thus excellent optical characteristics may be implemented in terms of light transmittance, haze, and the like, and for example, as the difference in refractive index is close to 0, excellent optical characteristics may be implemented.

For example, the isoprene-based rubber containing a carboxyl group may have a refractive index of about 1.525 to about 1.542, and the optical adhesive composition may include an isobornyl (meth)acrylate having a refractive index of 1.47 or more, or a tricyclodecane dimethanol diacrylate having a refractive index of 1.506 to 1.508 as the acrylic acid ester-based monomer. In this case, the difference in refractive index between the isoprene-based rubber containing a carboxyl group and the acrylic acid ester-based monomer may be close to 0, and the difference in refractive index, which is close to 0, may be advantageous to secure excellent optical characteristics.

The optical adhesive composition may further include a tackifier, if necessary. The tackifier serves to adjust peel strength and attachment strength of the optical adhesive composition, and may include at least one selected from the group consisting of, for example, a hydrogenated dicyclopentadiene-based compound, a hydrogenated terpene-based compound, a hydrogenated rosin-based compound, a hydrogenated aromatic compound, and a combination thereof.

The tackifier includes a hydrogenated compound, and thus it may be advantageous in securing high light transmittance and visibility through the optical adhesive composition, and may be more advantageous in imparting tack performance.

The hydrogenated compound of the tackifier may be a partially hydrogenated or completely hydrogenated compound. Specifically, the hydrogenated compound of the tackifier may have a hydrogenation rate of about 60% or more, for example, 100%. When the hydrogenation rate is less than about 60%, a lot of double bonds are included in the molecule, and thus, an adhesive layer formed of the optical adhesive composition fails to have transparency, and the photo energy absorptivity of the double bonds is increased so that the photo energy is absorbed during the photo irradiation for curing, and as a result, there may occur a problem in that an adhesive property and peel strength deteriorate, or are non-uniform.

The optical adhesive composition implements both excellent barrier performance and excellent adhesive performance through the thermosetting component and the photo-curable component, and may be used for an adhesive layer which is disposed on at least one surface of a base material including a metal oxide.

Specifically, the metal oxide of the base material including the metal oxide may include at least one selected from the group consisting of silicon nitride, silicon oxide, aluminum nitride, aluminum oxide, zinc oxide, and a combination thereof.

The base material including the metal oxide has high surface energy, so that it is difficult to secure excellent adhesive performance by using a rubber-based adhesive or an acrylic adhesive in the related art, and as a result, there occurs a problem in that durability and barrier performance deteriorate. In this regard, the optical adhesive composition according to an exemplary embodiment of the present invention includes both the thermosetting component and the photo-curable component, and thus may exhibit excellent adhesive performance for a base material including the metal oxide, and the optical adhesive composition according to an exemplary embodiment of the present invention is used for an adhesive layer which is disposed on at least one surface of the base material, and thus the adhesive layer may be firmly adhered to the base material, thereby obtaining an advantage in that excellent durability and barrier performance are implemented.

Another exemplary embodiment of the present invention provides an optical adhesive film including: an adhesive layer including a photo-cured product of the optical adhesive composition; and a release film disposed on one surface or both surfaces of the adhesive layer.

FIG. 1 schematically illustrates an adhesive film 100. Referring to FIG. 1, the adhesive film 100 may include an adhesive layer 10 including a photo-cured product of the optical adhesive composition and a release film 20 disposed on both surfaces of the adhesive layer 10.

The adhesive film 100 may be manufactured by applying the optical adhesive composition onto an upper portion of the release film 20, selectively applying an additional release film 20 onto an upper portion of the applied optical adhesive composition, and then photo curing the optical adhesive composition through photo irradiation to form the adhesive layer 10.

The adhesive film includes an adhesive layer including a photo-cured product of the optical adhesive composition, and matters on the optical adhesive composition are the same as those described above. The adhesive film may secure an excellent cutting property and an excellent handling property by including an adhesive layer formed from the optical adhesive composition, and as a result, the adhesive film may obtain an advantage in that both improved barrier performance and improved adhesive performance are secured.

The adhesive layer of the adhesive film includes specifically a cured product before a secondary thermal curing after a primary photo curing of the optical adhesive composition. The adhesive layer may secure an excellent cutting property and an excellent handling property by including a photo-cured product of the optical adhesive composition, and may exhibit excellent step difference absorbency when applied to a base material of a final product.

Specifically, the photo-cured product is a cured product before the secondary thermal curing after the primary photo curing, and the curing degree thereof may be about 1% to about 30%, for example, about 1% to about 15%, and for example, about 10% to about 20%. The curing degree of the photo-cured product satisfies the range, and thus, the adhesive film may secure an excellent cutting property and an excellent handling property, and the adhesive layer may exhibit excellent step difference absorbency when being mounted on a device including an electronic device or an OLED, and the like, and may implement excellent adhesive performance by an additional thermal curing. The curing degree is measured by the following Equation 1 and indicates a curing degree of a cured product.

$$\text{Curing Degree (\%)} = \{1 - (Wi - Wf)/Wi\} \times 100 \quad \text{[Equation 1]}$$

In Equation 1, Wi indicates a weight of a sample which is measured before a sample obtained by cutting the adhesive layer into a predetermined size is immersed in a solvent, and Wf indicates a weight of the remaining sample after the sample is left to stand for a predetermined period of time while being immersed in the solvent, and subsequently, the sample is filtered by using a filtration device. The type of solvent and the period of time for leaving the sample to stand while immersing the sample in the solvent may vary depending on the cured product of which the curing degree is to be measured.

The solvent may be measured by determining an appropriate reference solvent, and for example, toluene may be used, but the solvent is not limited thereto. The period of time for leaving the sample to stand while immersing the sample in the solvent may be appropriately selected, and may be, for example, about 4 weeks, but is not limited thereto.

The release film of the adhesive film is peeled off and removed when the adhesive film is applied to a final product, and may be stacked on one surface or both surfaces of the adhesive layer.

The adhesive layer includes a photo-cured product of the optical adhesive composition, and may be subjected to an additional thermal curing. The additional thermal curing of the adhesive layer may be carried out after the release film of the adhesive film is peeled off and removed, and the adhesive layer is applied to a base material of a final product.

That is, the adhesive layer may be applied to a base material of a final product in a partially cured state in which only the photo-curable component of the optical adhesive composition is cured, and the thermosetting component thereof is not cured, and thereafter, the adhesive layer may be subjected to an additional thermal curing to be completely cured. Therefore, the adhesive layer may exhibit excellent step difference absorbency, and may implement increased peel strength as compared to the case where the adhesive layer is completely cured by using only a single curing or one curing process.

When the adhesive layer is applied to a base material of a final product, the base material of the final product may be a base material including a metal oxide, and matters on the base material including a metal oxide and the metal oxide are the same as those described above.

The adhesive layer may have peel strength of about 700 g/in to about 2,500 g/in, for example, about 1,500 g/in to about 2,500 g/in, and for example, about 2,000 g/in to about 2,500 g/in, for the base material including a metal oxide after the adhesive layer is subjected to the additional thermal curing at a thickness of 25 μm. The adhesive layer is formed from the optical adhesive composition and thus may have these physical properties, and exhibits peel strength within the range for the base material after the thermal curing and thus may impart improved durability to a final product.

The thermal curing of the adhesive layer may be carried out at about 40° C. to about 100° C. More advantageously, the thermal curing may be carried out at about 50° C. to about 65° C. The adhesive layer includes a thermosetting component of the optical adhesive composition, and the thermal curing is carried out at a temperature within the range, and thus it is possible to cure the thermosetting component so as to implement a target curing degree, and simultaneously, to prevent the loss of the photo-cured product.

When the adhesive layer is subjected to an additional thermal curing to be completely cured, the curing degree measured by Equation 1 may be about 50% to about 85%. There is a concern in that when the curing degree after the additional thermal curing is less than about 50%, the long-term durability or the high-temperature durability may be weak, and when the curing degree after the additional thermal curing is more than about 85%, the peel strength may deteriorate.

Hereinafter, specific examples of the present invention will be suggested. However, the Examples described below are only provided for specifically exemplifying or explaining the present invention, and the present invention is not limited thereby.

EXAMPLES AND COMPARATIVE EXAMPLES

Example 1

There was prepared a thermosetting component having a weight average molecular weight (Mw) of 30,000 and including an aziridine-based thermal curing agent (poly functional aziridine; HX-868 DYNAMAR) in an amount of 2 parts by weight based on 100 parts by weight of an isoprene-based rubber containing a carboxyl group, the carboxyl group being contained in an amount of 15 wt %. Subsequently, there was prepared a photo-curable component including a photoinitiator (BASF, IRGACURE 651) in an amount of 0.3 part by weight based on 100 parts by weight of tricyclodecane dimethanol diacrylate as an acrylic acid ester-based monomer. An optical adhesive composition was prepared by mixing 93 parts by weight of the thermosetting component with 7 parts by weight of the photocurable component.

Example 2

There was prepared a thermosetting component having a weight average molecular weight (Mw) of 30,000 and including an amine-based thermal curing agent (4,4-methylenebiscyclohexylamine) in an amount of 2 parts by weight based on 100 parts by weight of an isoprene-based rubber containing a carboxyl group, the carboxyl group being contained in an amount of 5 wt %. Subsequently, there was prepared a photo-curable component including a photoinitiator (BASF, IRGACURE 651) in an amount of 0.3 part by weight based on 100 parts by weight of tricyclodecane dimethanol diacrylate as an acrylic acid ester-based monomer. An optical adhesive composition was prepared by mixing 8 parts by weight of the photo-curable component with 100 parts by weight of the thermosetting component.

Example 3

There was prepared a thermosetting component having a weight average molecular weight (Mw) of 30,000 and including an amine-based thermal curing agent (4,4-methylenebiscyclohexylamine) in an amount of 2 parts by weight based on 100 parts by weight of an isoprene-based rubber containing a carboxyl group, the carboxyl group being contained in an amount of 15 wt %. Subsequently, there was prepared a photo-curable component including a photoinitiator (BASF, IRGACURE 651) in an amount of 0.3 part by weight based on 100 parts by weight of tricyclodecane dimethanol diacrylate as an acrylic acid ester-based monomer. An optical adhesive composition was prepared by mixing 8 parts by weight of the photo-curable component with 100 parts by weight of the thermosetting component.

Example 4

There was prepared a thermosetting component having a weight average molecular weight (Mw) of 30,000 and including an aziridine-based thermal curing agent (polyfunctional aziridine; HX-868 DYNAMAR) in an amount of 3 parts by weight based on 100 parts by weight of an isoprene-based rubber containing a carboxyl group, the carboxyl group being contained in an amount of 15 wt %. Subsequently, there was prepared a photo-curable component including a photoinitiator (BASF, IRGACURE 651) in an amount of 0.8 part by weight based on 100 parts by weight of tricyclodecane dimethanol diacrylate as an acrylic acid ester-based monomer. An optical adhesive composition was prepared by mixing 8 parts by weight of the photo-curable component with 100 parts by weight of the thermosetting component.

Comparative Example 1

There was prepared a photo-curable acrylic adhesive composition including 70 parts by weight of a diluted monomer including ethylhexyl acrylate (EHA) and isobornyl acrylate (IBOA) and 0.75 part by weight of a photoinitiator (BASF, IRGACURE 184) based on 100 parts by weight of an acrylic resin, which is manufactured by copolymerizing ethylhexyl acrylate (EHA), isobornyl acrylate (IBOA), and hydroxyethyl acrylate (HEA), and including a coupling agent and a urethane curing agent.

Comparative Example 2

There was prepared an adhesive composition including 30 parts by weight of a terpene-based tackifier, 0.5 part by weight of a photoinitiator (BASF, IRGACURE 184), and 7 parts by weight of tricyclodecane dimethanol diacrylate as an acrylic acid ester-based monomer, based on 100 parts by weight of a styrene-butadiene rubber (LG Chem.).

Comparative Example 3

There was prepared an adhesive composition including 15 parts by weight of a terpene-based tackifier, 0.5 part by weight of a photoinitiator (BASF, IRGACURE 184), and 7 parts by weight of tricyclodecane dimethanol diacrylate as an acrylic acid ester-based monomer, based on 100 parts by weight of an isoprene-based rubber containing no carboxyl group (LG Chem.).

Evaluation

Each of the adhesive compositions in Examples 1 to 4 and Comparative Examples 1 to 3 was applied onto an upper portion of a release film, and an additional release film was disposed at an upper portion of the applied optical adhesive composition.

Subsequently, in the case of Example 1, an adhesive layer including a photo-cured product having a curing degree of 12% was formed by irradiating the optical adhesive composition with the photo energy of 2,000 mJ/cm$^2$ UV-A to subject the optical adhesive composition to a primary photo curing. Subsequently, one of the release films was peeled off and removed, the adhesive layer was attached to a base material including silicon nitride, and then the adhesive layer was completely cured so as to have a curing degree of 78% by carrying out a secondary thermal curing at a temperature of 50° C.

From the adhesive composition in Comparative Example 1, an adhesive layer including a photo-cured product having a curing degree of 95% was formed by a photo curing method. Subsequently, one of the release films was peeled off and removed, and the adhesive layer was attached to a base material including silicon nitride.

From the adhesive composition in Comparative Example 2, an adhesive layer including a photo-cured product having a curing degree of 63% was formed by a photo curing method. Subsequently, one of the release films was peeled off and removed, and the adhesive layer was attached to a base material including silicon nitride.

From the adhesive composition in Comparative Example 3, an adhesive layer including a photo-cured product having a curing degree of 65% was formed by a photo curing method. Subsequently, one of the release films was peeled off and removed, and the adhesive layer was attached to a base material including silicon nitride.

Experimental Example 1: Measurement of Peel Strength

For the adhesive layers in Examples 1 to 4 and Comparative Examples 1 to 3, peel strength with the base material including the silicon nitride was measured at a peeling rate of 300 mm/min by using a universal testing machine (UTM), and the results are shown in the following Table 1.

Experimental Example 2: Measurement of Water Vapor Transmission Rate

For each of the adhesive layers in the Examples 1 to 4 and Comparative Examples 1 to 3, a predetermined amount of water was poured into a cup under conditions of a temperature of 38° C. and a relative humidity of 90%, the adhesive layer was loaded thereon, the cup was capped, and then a water vapor transmission rate (WVTR) was measured by means of Labthink TSY-T3 by using a weight loss of water evaporated for 24 hours, and the results are shown in the following Table 1.

TABLE 1

| | Water vapor transmission rate (g/m$^2$ · 24 hr) | Peel strength (g/in) |
|---|---|---|
| Example 1 | 34 | 2167 |
| Example 2 | 37 | 1669 |
| Example 3 | 37 | 2068 |
| Example 4 | 35 | 1568 |
| Comparative Example 1 | 89 | 2680 |
| Comparative Example 2 | 42 | 1670 |
| Comparative Example 3 | 39 | 832 |

Referring to the results in Table 1, it could be seen that Examples 1 to 4 exhibited significantly low water vapor transmission rates as compared to Comparative Examples 1 to 3, and had excellent water vapor barrier performance. Furthermore, it could be seen that Examples 1 to 4 were manufactured by using a thermosetting component containing an aziridine-based thermal curing agent and thus exhibited lower water vapor transmission rates than the case where an amine-based thermal curing agent was used as in Examples 2 and 3, thereby implementing much better water vapor barrier performance.

It could be seen that Comparative Example 1 was an adhesive layer manufactured from an acrylic photo-curable adhesive composition, exhibited a more advantageous result in terms of peel strength than the results in Examples 1 to 4, but had a significantly high water vapor transmission rate, and thus the water vapor barrier performance significantly deteriorated.

It could be confirmed that Comparative Example 2 was an adhesive layer manufactured from a styrene-butadiene rubber-based adhesive composition, had worse effects in terms of peel strength and water vapor transmission resistance than the effects in Examples 1 to 3, and exhibited a slightly higher peel strength, but had a worse water vapor transmission resistance than in Example 4.

It could be confirmed that Comparative Example 3 was an adhesive layer manufactured from an adhesive composition including an isoprene-based rubber containing no carboxyl group, and the water vapor transmission resistance did not significantly deteriorate, but the peel strength was significantly reduced as compared to those in Examples 1 to 4.

From the results, it could be seen that through an optical adhesive composition including the thermosetting component and the photo-curable component according to the present invention, it is possible to exhibit excellent adhesive performance with respect to a base material including a metal oxide, and implement an improved water vapor transmission resistance.

EXPLANATION OF REFERENCE NUMERALS AND SYMBOLS

100: Adhesive film
10: Adhesive layer
20: Release film

The invention claimed is:

1. An optical adhesive composition comprising:
   a thermosetting component comprising an isoprene-based rubber containing a carboxyl group, and a thermal curing agent; and
   a photo-curable component comprising an acrylic acid ester-based monomer, and a photoinitiator.

2. The optical adhesive composition of claim 1, wherein the optical adhesive composition comprises the photo-curable component in an amount of 5 to 70 parts by weight based on 100 parts by weight of the thermosetting component.

3. The optical adhesive composition of claim 1, wherein the isoprene-based rubber containing a carboxyl group comprises the carboxyl group in an amount of 1 to 15 wt %.

4. The optical adhesive composition of claim 1, wherein the isoprene-based rubber containing a carboxyl group does not have any photo-curable functional group.

5. The optical adhesive composition of claim 1, wherein the thermal curing agent comprises at least one selected from the group consisting of an aziridine-based curing agent, an isocyanate-based curing agent, an epoxy-based curing agent, and a combination thereof.

6. The optical adhesive composition of claim 1, wherein the acrylic acid ester-based monomer comprises at least one selected from the group consisting of dicyclopentadiene (meth)acrylate, isobornyl (meth)acrylate, cyclohexyl (meth)acrylate, stearyl (meth)acrylate, tricyclodecane dimethanol diacrylate, dipentaerythritol pentaacrylate, pentaerythritol tetraacrylate, trimethylolpropane trimethacrylate, nonanediol dimethacrylate, cyclohexanediol dimethacrylate, and a combination thereof.

7. The optical adhesive composition of claim 1, wherein the photoinitiator comprises at least one selected from the group consisting of benzoin methyl ether, 2,4,6-trimethylbenzoyl diphenylphosphine oxide, bis(2,4,6-trimethylbenzoyl) phenylphosphine oxide, α,α-methoxy-α-hydroxyacetophenone, 2-benzoyl-2-(dimethylamino)-1-[4-(4-morpholinyl) phenyl]-1-butanone, 2,2-dimethoxy-2-phenylacetophenone, 2,2-dimethoxy-1,2-diphenylethan-1-one, 1-hydroxy-cyclohexyl-phenyl ketone, 2-benzyl-2-(dimethylamino)-1-[4-(4-morpholinyl)phenyl]-1-butanone, and a combination thereof.

8. The optical adhesive composition of claim 1, further comprising:
   a tackifier.

9. The optical adhesive composition of claim 8, wherein the tackifier comprises at least one selected from the group consisting of a hydrogenated dicyclopentadiene-based compound, a hydrogenated terpene-based compound, a hydrogenated rosin-based compound, a hydrogenated aromatic compound, and a combination thereof.

10. The optical adhesive composition of claim 1, wherein the thermosetting component comprises the thermal curing agent in an amount of 0.05 to 5 parts by weight based on 100 parts by weight of the isoprene-based rubber containing a carboxyl group.

11. The optical adhesive composition of claim 1, wherein the photo-curable component comprises the photoinitiator in an amount of 0.05 to 1.5 parts by weight based on 100 parts by weight of the acrylic acid ester-based monomer.

12. The optical adhesive composition of claim 1, wherein the optical adhesive composition is used for an adhesive layer disposed on at least one surface of a base material comprising a metal oxide or a metal nitride.

13. The optical adhesive composition of claim 12, wherein the metal oxide or the metal nitride comprises at least one selected from the group consisting of silicon nitride, silicon oxide, aluminum nitride, aluminum oxide, zinc oxide, and a combination thereof.

14. An optical adhesive film comprising:
- an adhesive layer comprising a photo-cured product of the optical adhesive composition according to claim 1; and
- a release film disposed on one surface or both surfaces of the adhesive layer.

15. The optical adhesive film of claim 14, wherein the photo-cured product has a degree of cure of 1% to 30%.

16. The optical adhesive film of claim 14, wherein the adhesive layer has peel strength of 700 g/in to 2,500 g/in for a base material comprising a metal oxide, after an additional thermal curing.

17. The optical adhesive film of claim 16, wherein the additional thermal curing is carried out at 40° C. to 100° C.

* * * * *